(12) United States Patent
Handwerker

(10) Patent No.: US 11,304,421 B2
(45) Date of Patent: Apr. 19, 2022

(54) PIZZA PEEL WITH AN ADAPTATION THAT CATCHES DUSTING POWDER

(71) Applicant: Louis Handwerker, Lake Worth, FL (US)

(72) Inventor: Louis Handwerker, Lake Worth, FL (US)

( * ) Notice: Subject to any disclaimer, the term of this patent is extended or adjusted under 35 U.S.C. 154(b) by 0 days.

(21) Appl. No.: 17/187,812

(22) Filed: Feb. 28, 2021

(65) Prior Publication Data

US 2021/0298312 A1 Sep. 30, 2021

Related U.S. Application Data

(60) Provisional application No. 63/002,478, filed on Mar. 31, 2020.

(51) Int. Cl.
*A21B 3/00* (2006.01)
*A47J 43/28* (2006.01)

(52) U.S. Cl.
CPC .............. *A21B 3/003* (2013.01); *A47J 43/288* (2013.01)

(58) Field of Classification Search
CPC ........ A21B 3/003; A47J 43/288; A47J 37/108
USPC .......................................................... 294/7, 8
See application file for complete search history.

(56) References Cited

U.S. PATENT DOCUMENTS

| | | | | |
|---|---|---|---|---|
| 1,809,320 A | * | 6/1931 | Thorfinnsson | A21B 3/003 |
| | | | | D7/688 |
| 3,411,723 A | * | 11/1968 | Kohn | B01L 3/18 |
| | | | | 294/7 |
| 5,213,384 A | * | 5/1993 | Baker | A21B 3/003 |
| | | | | 294/7 |
| D458,802 S | * | 6/2002 | Richied | D7/395 |
| 6,783,782 B1 | * | 8/2004 | Larsen | A21D 10/025 |
| | | | | 426/94 |
| D545,150 S | * | 6/2007 | Volpe | D7/686 |
| D594,274 S | * | 6/2009 | McKenzie | D7/395 |
| D602,313 S | * | 10/2009 | Busse | D7/688 |
| D853,207 S | * | 7/2019 | Zemel | D7/692 |
| 2004/0156963 A1 | * | 8/2004 | Amoroso | A21B 3/003 |
| | | | | 426/482 |
| 2008/0203746 A1 | * | 8/2008 | Cunningham | A21B 3/003 |
| | | | | 294/7 |
| 2012/0210841 A1 | * | 8/2012 | Getzinger | A47G 19/022 |
| | | | | 269/295 |
| 2015/0272362 A1 | * | 10/2015 | Lisek | A47J 43/288 |
| | | | | 294/7 |

* cited by examiner

*Primary Examiner* — Paul T Chin
(74) *Attorney, Agent, or Firm* — F Rhett Brockington

(57) ABSTRACT

An grooved pizza peel that when transferring an uncooked pizza to a pizza oven the invented grooved pizza peel retains dusting powder, wherein an adaptation includes a plurality of elongate grooves in a leading planar region of the pizza peel, wherein each of the elongate grooves is proximate to a frontal portion of the pizza peel, wherein the frontal portion has a sloped arced front portion with a bottom edge and an upper edge; wherein the grooves extend to the sloped arced front portion and the plurality of elongate grooves are straight and about parallel to each other. The adaptation ensures that even with a heavy loading of the dusting powder any excess dusting powder is retained. The plurality of elongate grooves have a preferred width of about 0.25 inches±about 0.1 inches. The adaptation retains as much as 85% of the dusting powder.

7 Claims, 7 Drawing Sheets

PIZZA PEEL WITH AN ADAPTATION THAT CATCHES DUSTING POWDER

CROSS-REFERENCES TO RELATED APPLICATIONS

The present patent application/patent claims the benefit of priority of U.S. Provisional Patent Application No. 63/002,478, filed on Mar. 31, 2020, and entitled "PIZZA PEEL WITH AN ADAPTATION THAT CATCHES DUSTING POWDER", the contents of which are incorporated in full by reference herein.

BACKGROUND OF THE INVENTION

1. Field of the Invention

The present invention relates to pizza peels, and more particularly to a grooved pizza peel having an adaptation that catches most of the dusting powder from being conveyed into a pizza oven when an uncooked pizza pie is moved from the pizza peel into the oven, wherein catching the powder reduces the necessity and frequency of cleaning the oven to remove the resulting charred dusting powder, where charred dusting powder affects the taste and texture of a pizza, imparts discoloration, and any retained dusting powder can be reused, so that cumulatively there is less usage of the dusting powder.

2. Background of the Invention

Cleaning the pizza stone is generally a required routine to keep the pizza oven clean. Some professionals use rakes and brooms to remove dusting powder from the stone of the oven. Ideally, the stone is brushed between bakes, to minimize the amount of charred dusting powder that accumulates in the oven from the bottoms of uncooked pizzas.

A dusting powder is applied to the peel to prevent the dough from sticking to the peel, so that the uncooked pizza can be easily slid off the peel when transferred into the pizza oven. Often the dusting powder contains at least some semolina; and at least a portion of the dusting powder is transferred to the cooking surface of the oven when it is cooked. Dusting powder not adhered to the bottom of pie and in contact with cooking surface will quickly burn, therein forming charred dusting powder. The presence of charred dusting powder is undesirable as it can negatively affect the taste and texture. To prevent charred dusting powder the cooking surface is cleaned frequently, typically with a variety of tools, and most commonly with some type of a brush.

The prevailing prior art teaches the use of as little of semolina as possible on the peel is preferable. Brushing the oven floor every few pies with a natural bristle brush is still preferable. Some contend that build-up of charred dusting powder can be mitigated by slapping the pizza peel on the cooking surface a couple times, where the slapping blows away most dusting powder.

Some pizza cooks teach that dusting the peel with plain flour (typically rice flour), instead of semolina, is preferable as advantageously plain flour will not build up like semolina. The teaching of rice flour is contested by others as being problematic because while flour does reduce the tack of the dough, it doesn't provide a comparable level of slip that is possible with semolina; and if the pizza pie doesn't slip off the peel easily then the uncooked pie has a propensity to distort and/or loose a topping when the pie is placed in the oven.

Metal peels like the Ooni™ 14" Perforated Pizza Peel are similar to spatulas, in that the peel has elongate perforations that are elongated perpendicular to the front edge. Ooni™ teaches that the perforations allow steam to escape through the perforations, which suggests that the pizza pie is actually cooked on the metal peel.

A compromise approach is to use a mixture of plain flour with about ¼ tsp of semolina on a wooden peel. Semolina acts like mini ball bearings to help the pizza slide so not much semolina is needed. The mixture can be used on a stainless steel peel that has a flat front edge. The flat front edge reputedly can be used to scrap the oven floor. Of possible concern with stainless steels which typically contain 10%-20% chromium, is that oxidation of chrome to hexavalent chromium, which is toxic.

In related observations on determining the correct temperature, the art teaches the use of a semolina test, wherein one casts about ¼ tsp of semolina into the center of the oven. If the semolina turns black in 2 secs the oven is too hot, and the pizza will have a burnt bottom. Three seconds is about right, four seconds is too cool, and the pizzas will take too long to cook or the bottom will be soft. A rule of thumb for wood fired ovens is that they will be too hot on the floor for the first pizza.

SUMMARY OF THE INVENTION

The invention is a grooved pizza peel having an adaptation that catches dusting powder used in pizza pie making, wherein a large portion of the dusting powder is retained on the grooved pizza peel by the adaptation when an uncooked pizza pie is slid from the grooved pizza peel into an oven. Advantageously, the adaptation reduces the necessity and frequency for cleaning the oven, and also reduces the propensity for forming charred dusting powder, where charred dusting powder can adversely affect the taste, texture, and color of a pizza.

A first aspect of the invention is that the adaptation enables more dusting powder to be used on the pizza peel, making sliding easier; albeit without the usual limitation that the dusting powder will be transferred into the oven when the pie is transferred from the peel to the oven. The adaptation includes a succession of parallel elongate grooves that catch the dusting powder when the freshly prepared pizza pie is being slid into the pizza oven. Advantageously, a slipperier peel reduces distortion of the pie and spillage of toppings.

A second aspect of the invention is the adaptation minimizes the amount of dusting powder that is deposited into the oven.

A third aspect of the invention is that the adaptation doesn't change the method of cooking the pizza pie.

A fourth aspect of the invention is that the adaptation makes wood peels even easier to use as the pizza pie slides off a tapered end portion the peel with less resistance than conventional peels.

A fifth aspect of the invention is that the dusting powder after being caught can be collected and reused, thus reducing the amount and cost for dusting powder; and A final aspect of the invention is that the adaptation reduces a frequency of cleaning the pizza oven.

These and other aspects and advantages of the present invention will be readily appreciable from the following description of preferred embodiments of the invention and from the accompanying drawings and claims.

BRIEF DESCRIPTION OF THE DRAWINGS

The foregoing invention will become readily apparent by referring to the following descriptions and the appended drawings in which.

DETAILED DESCRIPTION OF THE INVENTION

Figure 1:
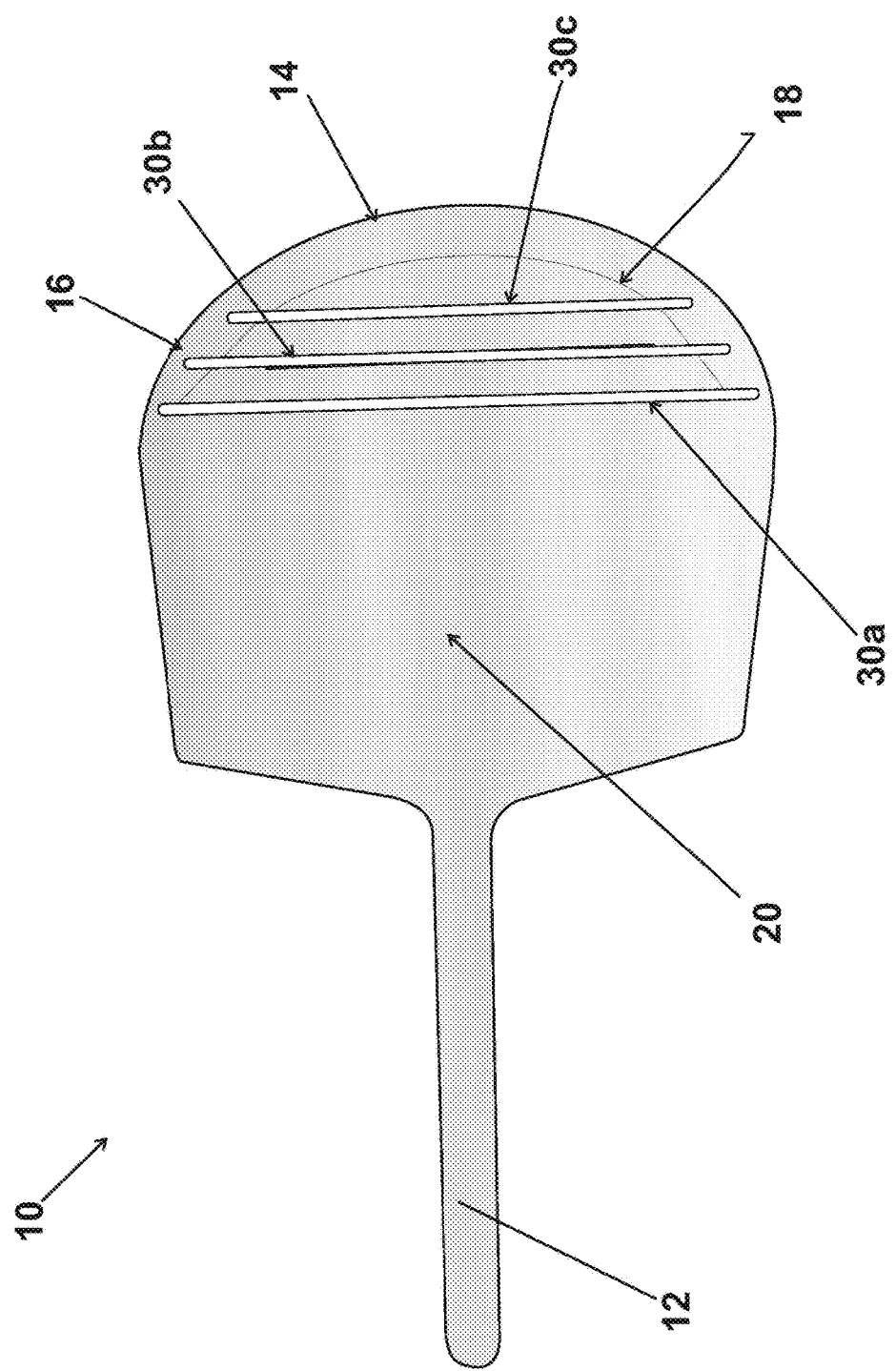
FIG. 1 is an overhead view of a relatively long handled wood grooved pizza peel that has a sloped arced front portion, wherein proximate to the frontal portion, is a leading planar region, and a plurality of elongate grooves that are parallel and extend into the sloped arced front portion.
Figure 2:
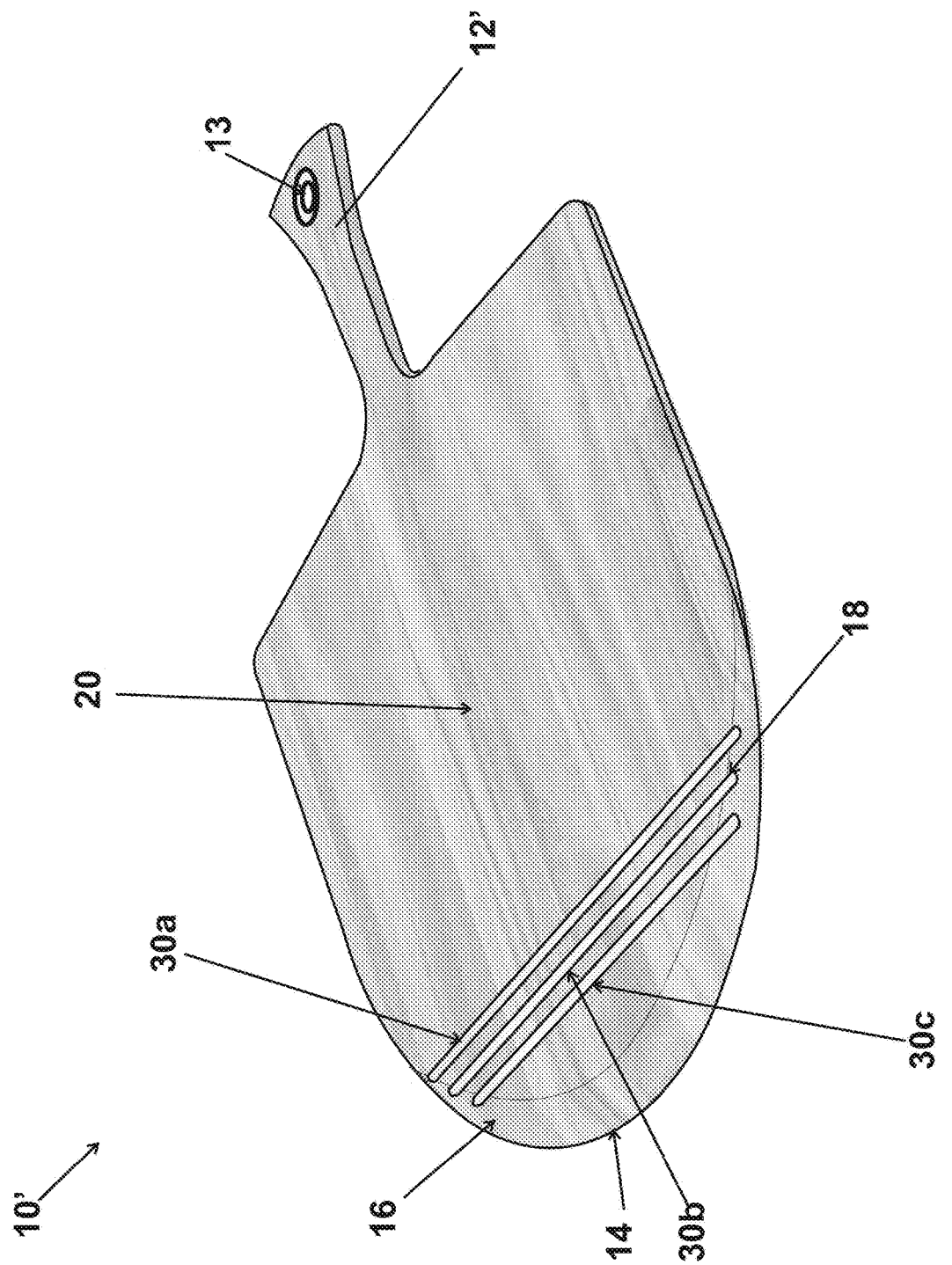
FIG. 2 is an overhead perspective view of a relatively short handled wood grooved pizza peel that has a sloped arced front portion, wherein proximate to the frontal portion, in a leading planar region, there is a plurality of elongate grooves that are parallel and extend into the sloped arced front portion.

Illustrative embodiments and exemplary applications will be described with reference to the accompanying drawings to disclose the advantageous teachings of the present invention.

Various embodiments of the invention are described more fully hereinafter with reference to the accompanying drawings, in which some, but not all of the embodiments of the invention are shown in the figures. Indeed, these inventions may be embodied in many different forms and should not be construed as limited to the embodiments set forth herein; rather, these embodiments are provided so that this disclosure will satisfy applicable legal requirements. Those having skill in the art and access to the teachings provided herein will recognize the additional utility.

The invention teaches an adaptation for a wood pizza peel, but the adaptation could be modified fora metal peel, which is normally thinner like a spatula, and could be formed to be suitable for either of the two methods described below.

There are two major methods for achieving for preparing pizza pies. In a first method, preparation of the pizza with all its toppings is on a work surface or table. Once prepared, the uncooked pizza is immediately transferred to a pizza peel for placement in the oven. This first method requires a lot of skill to make an assembled pizza pie with all its toppings before the assembled pie is moved onto the peel without incident. The peel is pre-dusted with a dusting powder having at least one ingredient selected from the group consisting of semolina, cornmeal, various flours and combinations of thereof; and placed into the oven, without incident.

The first method is typically performed with a metal peel, as it is thin and can slide under an uncooked pizza pie on the counter. This is further facilitated as the metal peel preferably has a thin edge blade.

The second method for preparing pizza pies is to use the work surface for stretching the dough to the proper diameter, and then transferring it to a pre-dusted peel for adding the toppings. Once the toppings are added the pizza pie is placed into the oven.

The second method typically requires less skill as only pizza dough is transferred on the peel. The pizza dough, which is typically disk shaped, is much lighter and forgiving when placed on the peel, as it will be absent the toppings that are present in the first method, and any deformation can be easily corrected.

Both methods necessitate that from the time that the dough is placed on the peel, until the time it is placed into the oven, the pizza dough should not stick to the pizza peel, even as it is worked, loaded and eventually slid into the oven. Using more dusting powder ensures that sticking is less likely. Pizza dough will stick to most surfaces, and a sufficient level of dusting powder needs to be present between a bottom of the dough and the peel. To successfully slide the pizza with toppings into the oven, neither the dusting powder nor the pizza dough can stick to the peel. The dusting powder has at least one ingredient selected from the group consisting of semolina, cornmeal, various flours and combinations thereof.

Some pizza dough recipes have a very high hydration, which makes the dough especially sticky. Adding toppings not only increases the weight of the pizza, it extends the time that the dough remains in contact with the peel. During the contact time, moisture, for example from a sauce, will further tackify the dough, therein potentially increasing adhesion to the peel as wetting is increased. Lengthening the dwell time facilitates surface adhesion of the dough to the surface of the peel, and coupled with an increased weight the combination facilitates increased surface adhesion of the dough to the surface of the peel, which increase adhesion and can significantly increase resistance to sliding.

In any case, whether the invented grooved pizza peel is wood or metal, the transfer of an uncooked pizza to the oven requires that the pizza can easily slide off the peel, as the transfer should not distort the pizza. Also, a low slide angle is required to prevent distortion. To achieve this there must be enough dusting powder under the uncooked pizza pie that the pizza slides easily when the peel is tilted. Because the adaption is designed to catch excessive dusting powder, the user can safely add additional dusting powder to insure to prevent sticking to the peel. Each pizza may have different toppings or weight, and different time on the peel. As such, a consistent application of a worst-case scenario of dusting powder provides for a more consistent transfer without guesswork. A hand rubbed layer of the slippery edible dusting powder is typically used, but in some cases a lighter dusting is sufficient, particularly if semolina is employed. Semolina reputedly is more efficient as it is nearly round, less granular than some flours, and therefore less likely to pack.

In general, when the pizza peel is used to position the uncooked pizza in the oven, the peel is typically slightly angled and/or retracted causing the pizza pie to slide into the oven onto the pizza stone. As the pizza pie slides it carries a portion of the dusting powder into the oven. As the pizza slides off the peel into the oven this is when most of the dusting powder is deposited in the oven.

A heavier dusting typically results in more dusting powder being conveyed into the oven. Metal pizza peels are less forgiving than wood pizza peels and they normally require a heavier level of dusting powder.

Traditional wooden peels require a dusting powder, but no known catching means to prevent dusting powder from being conveyed into the pizza oven.

As previously discussed the introduction of excess dusting powder onto a hot pizza stone will burn, thereby altering the taste of the finished product. The burnt dusting powder also remains in the oven after the pizza is removed.

Figure 7:
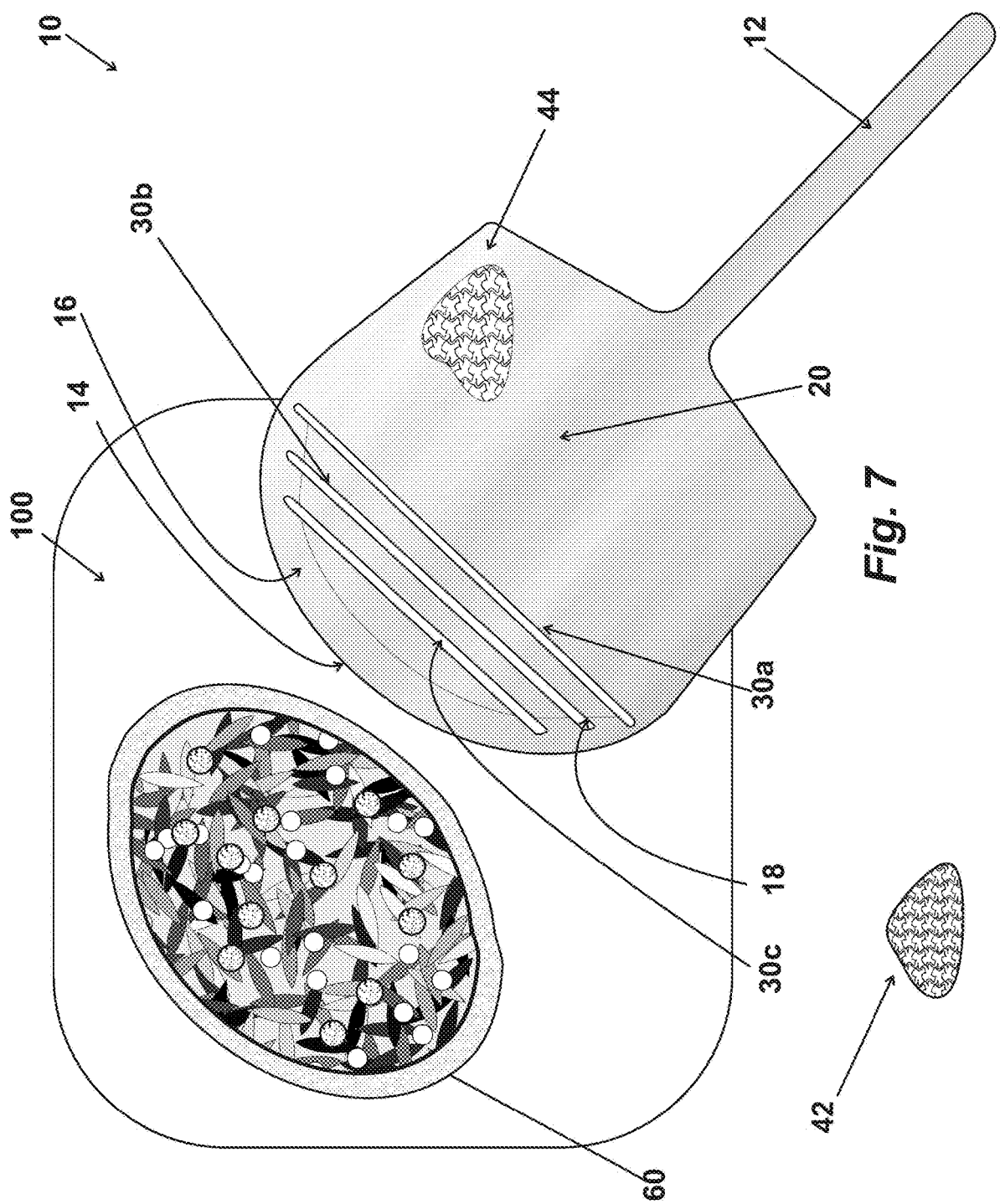
FIG. 7 is an overhead view of the relatively long handled wood grooved pizza peel with the sloped arced front portion, wherein the elongate parallel grooves of the pizza peel has been tapped on a working surface, emptying the elongate parallel grooves and the planar region of the peel of the caught and collected dusting powder, where the collected dusting powder is now piled up for reuse, and the pizza has been cooked and is on a tray.

As shown in FIG. 1 and FIG. 7, the grooved pizza peel 10 can have a relatively long handle 12 or, as shown in FIG. 2-FIG. 6, the grooved pizza peel 10' can have a short handle 12'. The wood peel that has a sloped arced front portion 16 with a bottom edge 14 and an upper edge 18, where the upper edge 18 is where the planar portion 20 changes to the sloped arced front portion 16. Proximate to the frontal portion 16, in the planar portion 20, the adaptation includes a succession of elongate grooves that are parallel to each other. The succession is a plurality of elongate grooves. Nominally, the plurality includes at least two elongate grooves, with three or more grooves being preferred. In both illustrated peels 10,10' there are three elongate parallel grooves 30a,30b,30c. The parallel grooves extend across a frontal section of the planar portion 20 to at least the upper edge 18 of the sloped arced front portion 16. Most of a length of each of the elongate parallel grooves is on the planar portion 20 proximate to the leading section, and opposing ends of an elongate parallel groove terminate in the sloped arced front portion 16.

As previous stated, the upper edge 18 defines where the grooved pizza peel changes from planar (flat) to sloped. The plurality of grooves incrementally catches and retains any overflow from a previous groove. Thus ensuring that even with a heavy loading of the dusting powder any excess dusting powder is caught and retained on the peel. The peel remains very slippery even with the succession of elongate grooves that are parallel as contact is largely limited to only when the peel is inclined. The incline reduces the apparent weight of the pizza pie by the cosine of incline.

In both of the illustrated embodiments 10,10' there are three elongate grooves. They are straight and parallel to each other. A preferred width is about 0.25 inches±about 0.1 inches. The exact length varies depending on the size of the peel and it's shape. A peel with a squarer frontal portion would tend to have grooves that are all closer to being the same length, albeit with an arced peel as shown in the illustrated peels 10,10' having the adaptation 30a,30b,30c, the length tends to shorten as does a geometric chord shortens as it gets closer to a perimeter of circle, but the chords are still long enough to extend beyond the upper edge 18 of the sloped arced front portion 16. A depth of the grooves 30a,30b,30c is nominally less than half of a thickness of a peel. With metal grooved pizza peels the bottom can be molded to incorporate the grooves, so the thickness of the metal pizza peel is not be a limitation of the depth of metal pizza peels.

Figure 3:
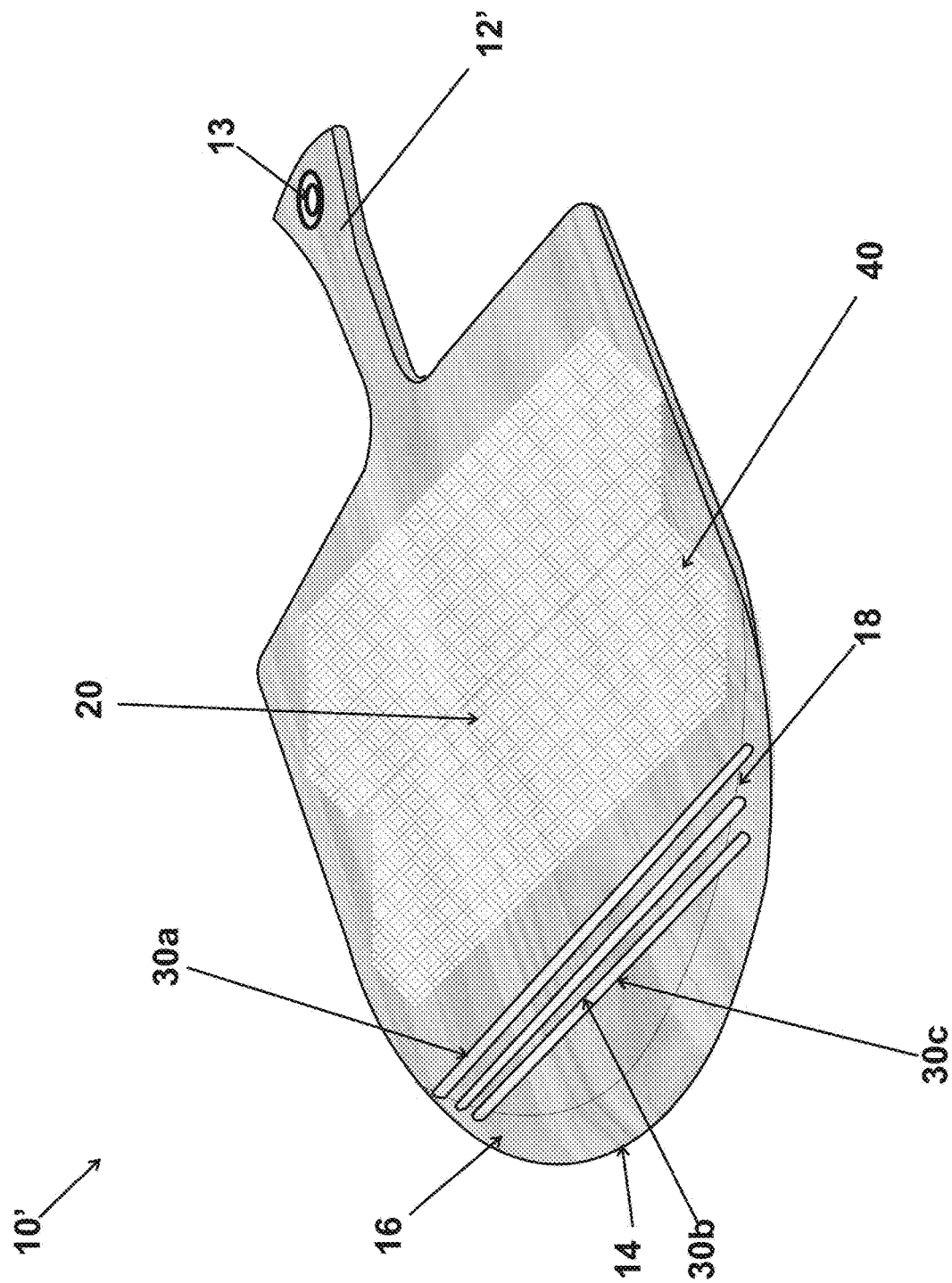
FIG. 3 is an overhead perspective view of the relatively short handled wood grooved pizza peel illustrated in FIG. 2, wherein substantially the entire planar region of the peel is coated with a dusting powder.

In FIG. 3, substantially the entire planar region 20 of the grooved pizza peel 20 is coated with the dusting powder 40 that has at least one ingredient selected from the group consisting of semolina, cornmeal, various flours and combinations thereof.

Figure 4:
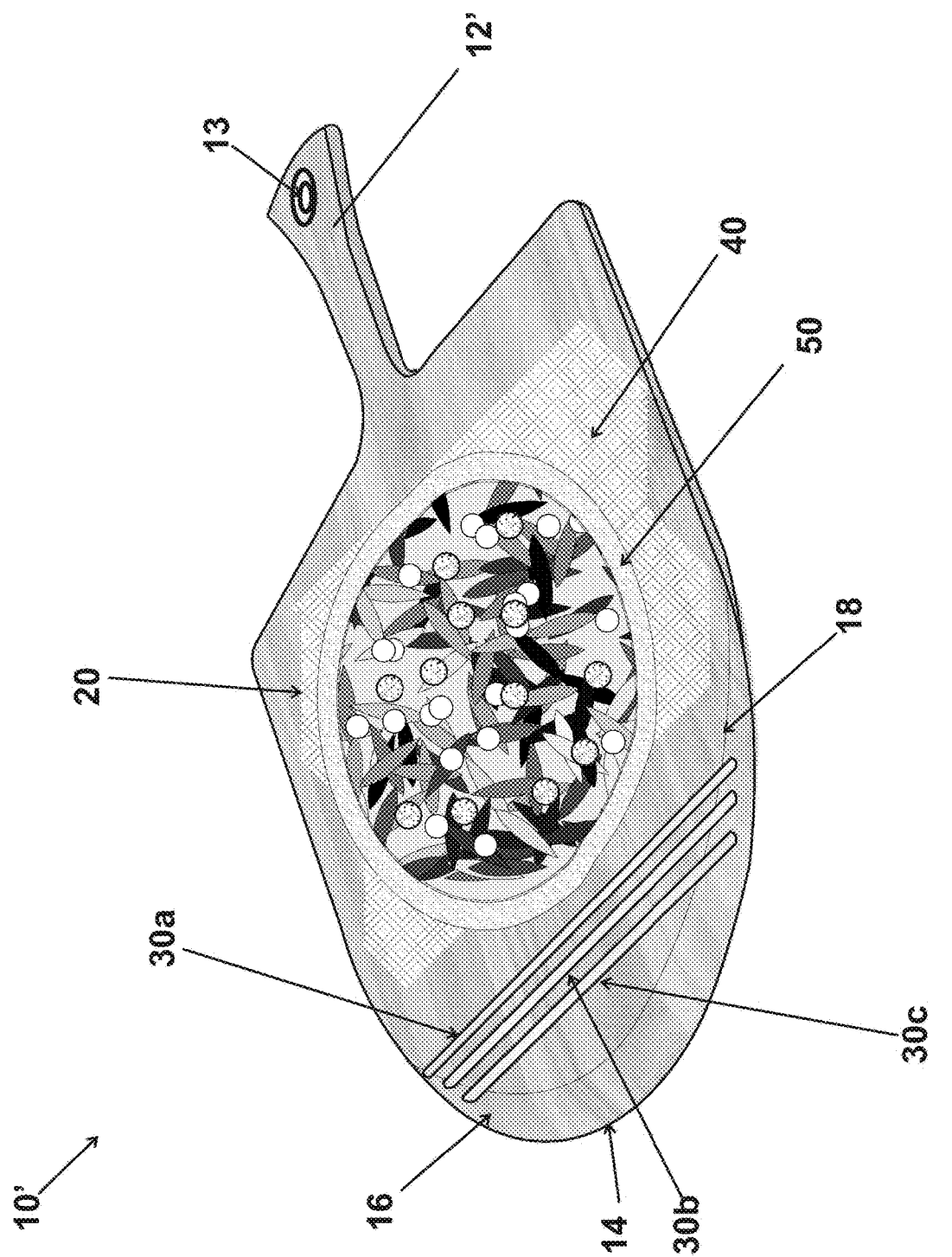
FIG. 4 is an overhead perspective view of the relatively short handled wood grooved pizza peel illustrated in FIG. 3, wherein a bottom of a pizza pie dough rests on a continuous coating of the dusting powder, while the sauces and other toppings are added, and the pie is ready to be cooked.

The pizza dough has been positioned on the dusting powder 40, and the toppings have been added forming an uncooked pizza 50. As illustrated In FIG. 4 the uncooked pizza is ready to be cooked.

Figure 5:
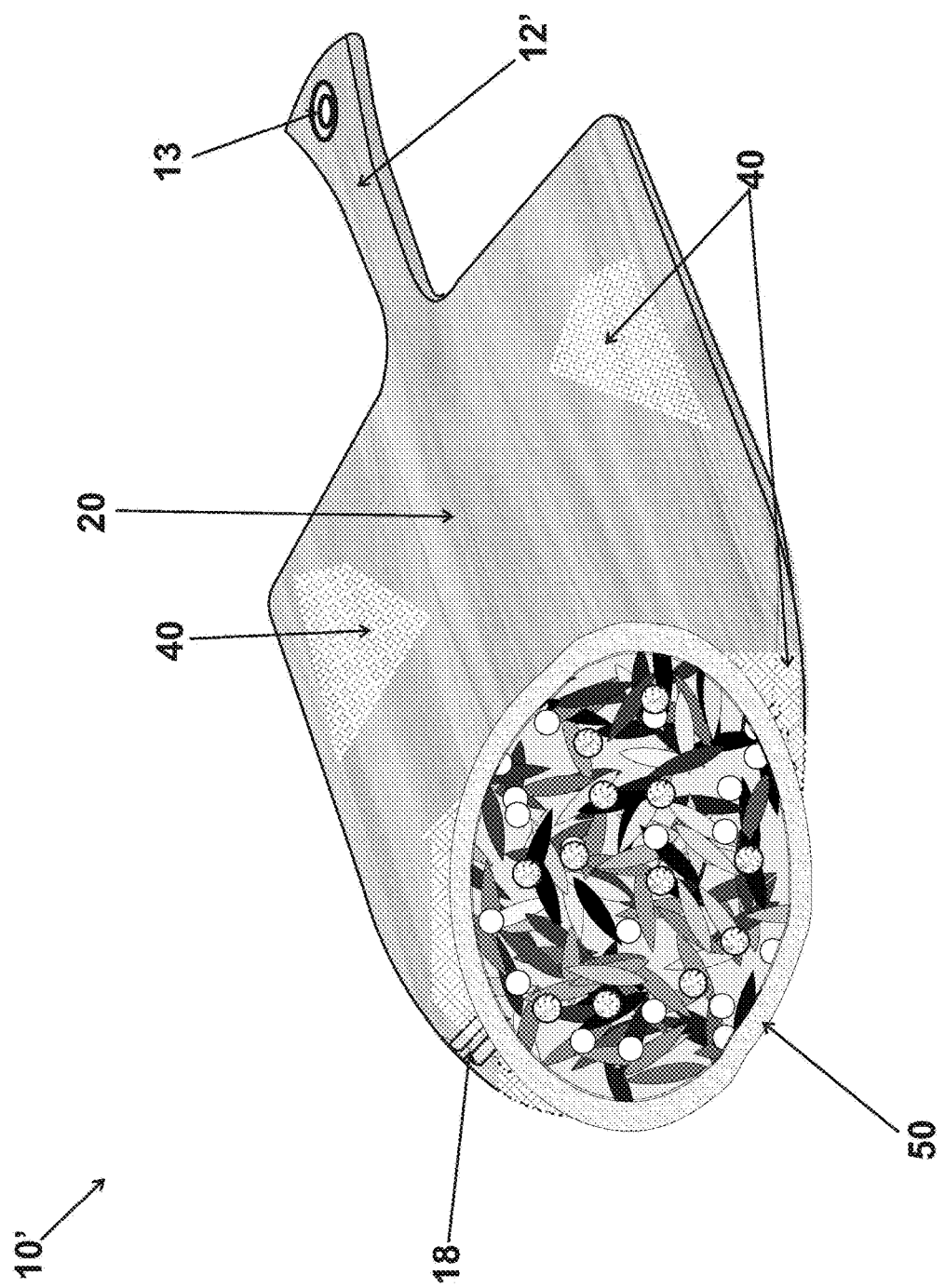
FIG. 5 is an overhead perspective view of the relatively short handled wood grooved pizza peel illustrated in FIG. 4, wherein the pizza pie is being slid into an oven, wherein as the pie is moved over the sloped arced front portion, the bottom of the uncooked pizza pie crosses over the succession of parallel elongate grooves, which catch and collect any excess dusting powder, therein preventing most of the loose dusting powder from being conveyed into the oven.
Figure 6:
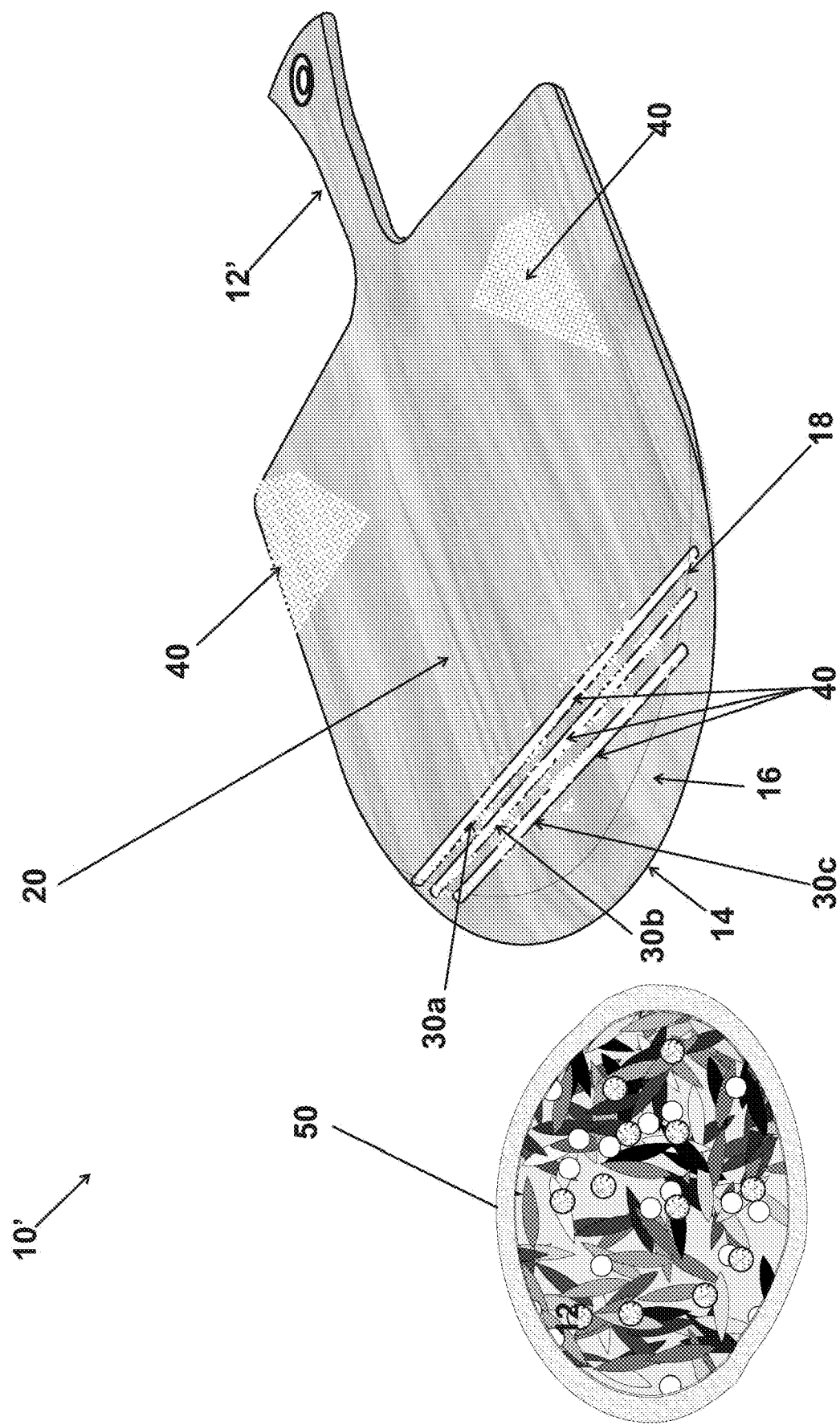
FIG. 6 is an overhead perspective view of the relatively short handled wood grooved pizza peel illustrated in FIG. 3, wherein much of the entire planar region of the peel is largely devoid of the dusting powder, as the dusting powder has been caught and collected in the elongate parallel grooves that extend to the sloped arced front portion.

The pizza pie is being slid into an oven (not shown) in FIG. 5, wherein as the pie slides over the sloped arced front portion 16, the bottom crosses over the elongate parallel grooves, which scrape off and collect any excess dusting powder 40, therein preventing much of the loose dusting powder from being conveyed into the oven. The grooves are not shallow sloping depressions, but have sharp angled rims approaching 90 degrees.

The entire planar region 20 of the peel 10' is largely devoid of the dusting powder 40. It is collected by the adaptation that includes the elongate grooves 30a, 30b, 30c. With close inspection the reader can see that the pizza peel still has some residual dusting powder 40, mostly on the planar portion 20 of the peel 10'.

Similarly, as shown in FIG. 7 the grooved pizza peel 10 with a long handle functions the same way. The pizza shown in FIG. 7 is cooked and sitting on a tray 100.

In a trial using only cornmeal dusting powder (no dough), a traditional wood pizza peel with a dusting of about 2 tsp of cornmeal, when inclined the traditional wood pizza peel releases about 92% (caught 8%) of the cornmeal dusting powder. The invented wood grooved pizza peel includes the adaptation of the elongate grooves, and when it is inclined only 47% (caught 53%) of the cornmeal dusting powder is released. So only about half as much dusting powder ever reaches the oven.

When the trial was run four times using pizza dough, the traditional wood pizza peel caught 9.75% (control), while the invented wood grooved pizza peel with the adaptation caught an average of 85% of the cornmeal dusting powder. The invented wood grooved pizza peel with the adaptation invention has an 8.7 fold improvement.

As shown in FIG. 7, a pile of collected dusting powder 42 is cut with fresh dusting powder 40 forming a recycled dusting powder 44. The recycled dusting powder 44 has only about 15% of virgin dusting powder to make another pizza 50. The recycled dusting powder 44 can not only be used on the peel as a dusting powder, but in the pizza itself, assuming that the recycled dusting powder 44 is compatible with the recipe. If the process is repeated 10 times, the dusting powder would still have about 20% of the initially collected, now recycled, dusting powder 42.

As previously stated the invented wood grooved pizza peel with the adaptation invention has an 8.7 fold improvement, catching 85% of the cornmeal dusting powder. Oven cleaning is cut from 90.25% to 15%, which is a factor of six fold. Since 85% of dusting powder can be reused, if the virgin dusting powder cost $1/lb, then the cost drops to $0.15/lb because 85% of the dusting powder can be reused.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A grooved pizza peel that catches a dusting powder when transferring an uncooked pizza pie to a pizza oven, wherein said grooved pizza peel comprises:
    a pizza peel with a handle attached to a planar region, said planar region having a leading planar region with a frontal portion having a sloped arced front portion with a bottom edge and an upper edge;
    a plurality of elongate grooves proximate to the frontal portion of the pizza peel, said plurality of elongate are about straight and about parallel to each other and extend to at least the sloped arced front portion and the plurality of elongate grooves are about straight and about parallel to each other; and
    wherein the grooved pizza peel catches and retains about 85% of the dusting powder when the uncooked pizza pie is transferred from the pizza peel into the pizza oven.

2. The grooved pizza peel according to claim 1, wherein said plurality of elongate grooves have a preferred width of about 0.25 inches±about 0.1 inches.

3. The grooved pizza peel according to claim 1, wherein said pizza peel is made of wood.

4. The grooved pizza peel according to claim 3, wherein said plurality of elongate grooves have a depth that is less than half of a thickness of the pizza peel.

5. The grooved pizza peel according to claim 1, wherein said plurality of grooves have angled rims, approaching 90 degrees.

6. The grooved pizza peel according to claim 1, wherein said plurality of elongate grooves is at least two elongate grooves.

7. The grooved pizza peel according to claim 1, wherein said plurality of elongate grooves extend across a frontal section of the planar portion to at least the upper edge of the sloped arced front portion, and each of the elongate parallel grooves is on the planar portion proximate to the leading section, wherein opposing ends of an elongate parallel groove terminate in the sloped arced front portion.

* * * * *